United States Patent
Humphries et al.

(10) Patent No.: US 7,672,281 B1
(45) Date of Patent: Mar. 2, 2010

(54) METHOD AND APPARATUS FOR OBTAINING SITUATIONAL AWARENESS INFORMATION FROM NODES IN A COMMUNICATIONS NETWORK

(75) Inventors: Thomas S. Humphries, Cedar Rapids, IA (US); Raja Kambhampati, Richardson, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1098 days.

(21) Appl. No.: 11/301,919

(22) Filed: Dec. 13, 2005

(51) Int. Cl.
*H04L 12/56* (2006.01)

(52) U.S. Cl. ............... 370/338; 370/390; 370/389; 455/450; 455/516; 455/517; 455/13.1; 455/428

(58) Field of Classification Search ............ 370/338, 370/331
See application file for complete search history.

(56) References Cited

U.S. PATENT DOCUMENTS

| | | | |
|---|---|---|---|
| 5,987,011 A * | 11/1999 | Toh | 370/331 |
| 6,721,537 B1 * | 4/2004 | Briesemeister | 455/11.1 |
| 7,212,918 B2 * | 5/2007 | Werback | 701/120 |
| 7,400,598 B1 * | 7/2008 | Humphries et al. | 370/315 |
| 2002/0163912 A1 * | 11/2002 | Carlson | 370/392 |
| 2004/0246904 A1 * | 12/2004 | Zhang et al. | 370/252 |
| 2006/0045087 A1 * | 3/2006 | Kurby | 370/390 |
| 2006/0268792 A1 * | 11/2006 | Belcea | 370/338 |

OTHER PUBLICATIONS

U.S. Appl. No. 11/159,459, entitled "Polymorphic Broadcast and Multicast Services for Wireless Networks," by Thomas S. Humphries, et al., filed Jun. 23, 2005.

* cited by examiner

*Primary Examiner*—Rafael Pérez-Gutiérrez
*Assistant Examiner*—Issam Chakour
(74) *Attorney, Agent, or Firm*—Daniel M. Berbieri

(57) ABSTRACT

A method of communicating in a wireless ad-hoc network is disclosed. The network has a plurality of nodes, including a requesting node, configured for wireless communication therebetween. Each node transmits a situational awareness message to adjacent nodes. The message informs other nodes of a geographic location of the transmitting node. Each adjacent node, upon receiving the message, re-transmits the message to nodes adjacent the adjacent nodes when the transmitting node is within a predetermined re-transmitting distance. The requesting node transmits a situational awareness request to the nodes in the network. Each node in the set of nodes transmits a situational awareness response to the situational awareness request. The situational awareness response provides a geographic location of said each node in the set of nodes. Each node in the network that receives the situational awareness response re-transmits the situational awareness response along a transmission path toward the requesting node.

8 Claims, 4 Drawing Sheets

METHOD AND APPARATUS FOR OBTAINING SITUATIONAL AWARENESS INFORMATION FROM NODES IN A COMMUNICATIONS NETWORK

RELATED APPLICATIONS

This application is related to U.S. application Ser. No. 11/159,459, "Polymorphic Broadcast and Multicast Services for Wireless Networks," filed Jun. 23, 2005, having the same inventors and assigned to the same assignor as the present application, said application being incorporated herein by reference in its entirety.

FIELD OF THE INVENTION

The invention relates to mobile communications networks, and more particularly, to methods of efficiently using broadcast resources within such networks.

BACKGROUND OF THE INVENTION

Ad-hoc networks are groups of interconnected devices, such as computers or transceivers, in which the topology and/or connectivity of the network may change at any time. Ad-hoc networks are advantageously used in circumstances where a plurality of devices desire or are required to communicate with each other.

In a wireless network, bandwidth is driven by the available RF spectrum, which is currently a scarce commodity. In this environment the most significant challenge associated with a broad-band wireless network is efficiently using the limited bandwidth provided by the network. This problem is made worse by the needs of a distributed network, which requires most or all of the nodes in the network to broadcast and/or multicast information to thereby pass the information through the network. Such broadcasting can take up a great deal of system bandwidth since a message may need to be repeated throughout the system. In a wired internet procotol (IP) based network, reducing the system load of broadcast services is resolved by isolating the broadcast area to a defined region of the network. In a mobile ad-hoc network, however, such isolation is not possible because the IP addresses do not represent a defined group of people within a fixed geographic region or location.

One type of mobile ad-hoc network in which broadcast communications may be overtaxed comprises a plurality of military resources or nodes such as tanks, infantry, unmanned aerial vehicles (UAVs), autonomous sensors, helicopters, and fixed-wing aircraft. Distributed situational awareness information for everyone in a theater of operation is helpful in supporting local decision makers in discovering resource availability and status, and in forming ad hoc force groups in order to engage the enemy. Using situational awareness information, local decision makers are given a visual representation of what is happening in the battlefield and are able to make decisions such as the makeup of a force group and the direction and way in which targets are engaged. Situational awareness information includes such attributes as location, type of resource, weapons availability, fuel status, resource availability and any other type of attribute that can be used to determine ability of a resource to engage an enemy. Unfortunately, transmitting distributed situational awareness information is a major source of broadcast and/or multicast traffic in a military wireless network and can overload many legacy networks. For example, a command center may periodically desire to know what military resources are within a specific geographic region for which the command center has responsibility. A request, broadcast by a command center or command node throughout a wireless network, may needlessly use broadcast resources if the request is transmitted to nodes outside of the specific geographic region. Furthermore, in even a moderately interconnected network the responses sent by the relevant nodes toward the command node may be returned using a plurality of broadcast paths, thereby wasting broadcast resources. What is therefore needed is a communications protocol that conserves communications resources while ensuring messages are transmitted to the desired nodes in a mobile ad-hoc network.

It is therefore an object of the invention to provide a communications protocol that conserves communications resources such as broadcast bandwidth.

It is another object of the invention to transmit situational awareness information in an ad-hoc mobile network only to nodes that have a need to receive the information.

It is still another object of the invention to permit a node to request and receive situational awareness information from some or all nodes in a network regardless of the distance between each node and the requesting node.

A feature of the invention is distance-limited re-transmission of periodically transmitted situational awareness messages, and non-distance limited re-transmission of responses to a situational awareness request from a command node.

An advantage of the invention is the conserving of communications resources by limiting the actual distance a situational awareness message is transmitted through the network.

SUMMARY OF THE INVENTION

The invention provides a method of communicating in a wireless ad-hoc network. The network has a plurality of nodes configured for wireless communication between the nodes. The plurality of nodes includes a requesting node. Each of the plurality of nodes transmits a situational awareness message to adjacent nodes. The situational awareness message informs other nodes of a geographic location of said each of the plurality of nodes. Each adjacent node, upon receiving the situational awareness message, re-transmits the situational awareness message to nodes adjacent said each adjacent node when said each of the plurality of nodes transmitting the situational awareness message is within a predetermined re-transmitting distance. The requesting node transmits a situational awareness request to the nodes in the network. The situational awareness request ascertains a geographic location of a set of nodes in the network. Each node in the set of nodes transmits a situational awareness response to the situational awareness request. The situational awareness response provides a geographic location of said each node in the set of nodes. Each node in the network that receives the situational awareness response re-transmits the situational awareness response along a transmission path toward the requesting node.

The invention also provides a method of sharing situational awareness information between nodes in a wireless communications network. Each node is one of a plurality of node types. Each node type is differentiated from other node types by non-communications characteristics of an entity associated with the respective each node. The network includes a requesting node. A first node periodically transmits a situational awareness message. A second node receives the situational awareness message. The second node determines a distance from the first node to the second node. The second node re-transmits the received situational awareness message when the first node is within a predetermined distance of the second node. The predetermined distance is dependent on the node type of the first node. The requesting node transmits a situational awareness request to a set of nodes in the network. The nodes in the set of nodes transmit a situational awareness response in response to the situational awareness request. Each node in the network, upon receiving any situational awareness response, re-transmits the response toward the requesting node.

The invention further provides a network having a plurality of nodes configured for wireless communication therebetween. The network includes means for periodically transmitting situational awareness information from an originating node to adjacent nodes, means for re-transmitting the situational awareness information at a re-transmitting node when the originating node is less than a predetermined distance from the re-transmitting node, means for requesting situational response information from all nodes in the network, and means for responding to the means for requesting. Each node in the network receiving the means for responding re-transmits the means for responding.

DETAILED DESCRIPTION OF THE DRAWINGS

Figure 1:
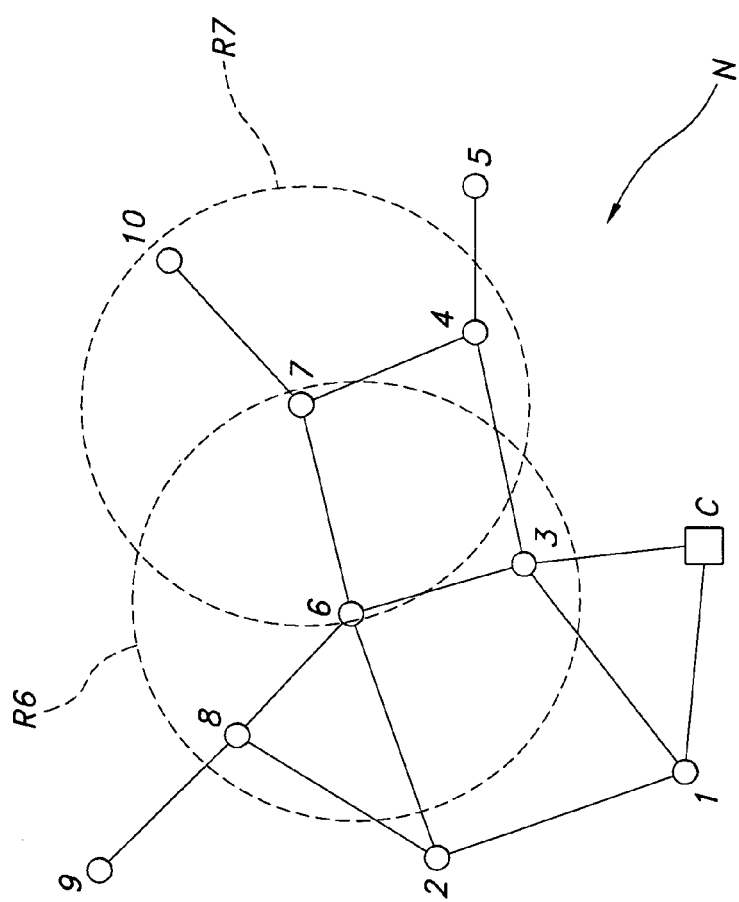
FIG. 1 is a diagram of a wireless network according to the invention.

The invention provides a method for a node in a wireless network to determine the presence and location of other nodes in the network. Such a wireless network is shown in FIG. 1 and indicated generally by reference letter N. Network N includes a command node C and a plurality of nodes 1, 2, 3, 4, 5, 6, 7, 8, 9 and 10. Lines connecting the various nodes indicate communications connectivity of the wireless network, which may be determined by any known algorithm or method. Messages are sent throughout the network so that each node knows the connectivity of the entire network. Each node communicates with those nodes to which it is connected as shown. For example, node 3 is shown as being able to directly communicate with nodes 1, 4, 6 and the command node. Node 3 can also indirectly communicate with nodes to which it is not directly connected. The path by which a node communicates with a distant node may be influenced by many factors, such as available communications resources, the size and data type of the message, communications capabilities of nodes within a potential path to the distant node, and other considerations. Using one or more known methods or algorithms, nodes in the network determine the best path to deliver messages between distant nodes.

Figure 2:
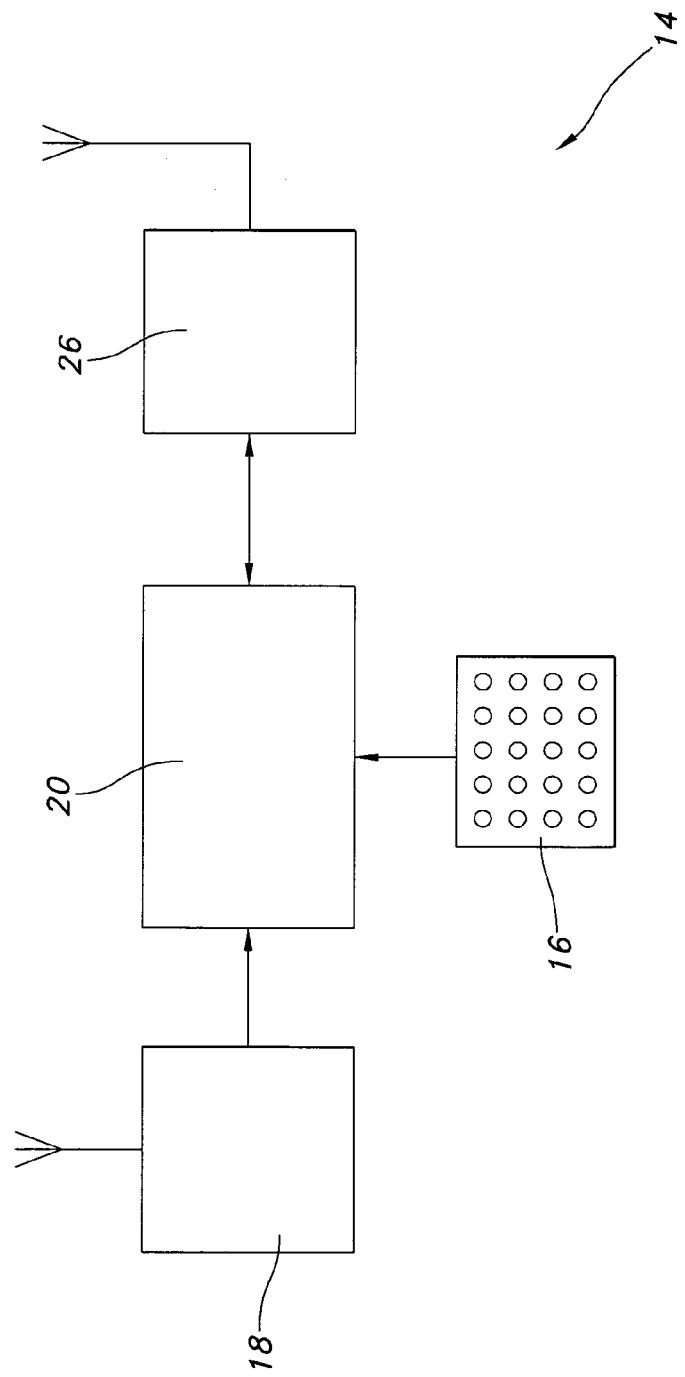
FIG. 2 is a block diagram of a communications device useable with the wireless network of FIG. 1.

FIG. 2 depicts a basic communications device 14 included with each node in network N. Device 14 includes an input 16, which may comprise one or more sensors, a camera, or a data input device such as a keyboard. Device 14 also includes a geolocator unit 18 that receives signals from earth-orbiting satellites and/or earth-bound transmitting or relay stations. Geolocator unit 18 derives a precise geographic location of the geolocator unit from signals received from such sources. The geolocator unit may comprise a global positioning system (GPS) or similar types of locating systems. Input 16 and geolocator unit 18 provide information to a processor 20, which assembles the information into a message. The message is sent to, and transmitted by, a transceiver 26, which includes components necessary to transmit and/or receive messages according to the frequencies and communication protocols used or recognized by the network. The components comprising device 14 may be integral in a single assembly, or alternatively may be separate components that together perform the functions of device 14.

Although the messages containing network connectivity information provide each node in the network with a substantially complete understanding of how the nodes in the network are connected, the connectivity messages do not include information on the actual locations of each node. It is helpful, especially in a tactical military environment, for each node to know the actual physical locations of nearby military resources, such as fixed-wing aircraft, rotor-wing aircraft, tanks, infantry units, and artillery units. Each node therefore periodically transmits a situational awareness (SA) signal or message to its neighbors, or in other words, to those nodes to which it is directly connected. Each node forwards or retransmits a received neighbor's SA message to other neighbors. By repeating the periodic transmittal and re-transmittal of SA messages, situational awareness information can be transmitted through the network.

Although in theory each node can receive SA information about every other node in the network, in practice such universal knowledge is not needed. For example, node 5 in FIG. 1, which may represent an infantry unit, does not need to know the actual location of node 9, representing another infantry unit, if the two infantry units are too far away to interfere with or assist one another. Furthermore, such universal location knowledge requires large amounts of communications bandwidth and can overwhelm actual messages in a network with 100 or more nodes. To reduce the resources required for SA messages, each node only forwards messages from nodes having a location within a predetermined range. For example, in FIG. 1 the predetermined forwarding ranges for nodes 6 and 7 are shown as R6 and R7, respectively. An SA message received by node 7 from node 10 will be forwarded to nodes 4 and 6 because node 10 is within the predetermined forwarding range R7 of node 7. On the other hand, node 6 will not continue to forward the SA message from node 10 because node 10 is beyond the predetermined forwarding range R6 of node 6. Node 6 will likewise not forward SA messages from nodes C, 1, 2, 4, 5, or 9 because those nodes are beyond the predetermined forwarding range R6. In this manner, the forwarding or re-transmission of SA messages is limited locally to geographically nearby nodes.

Figure 3:
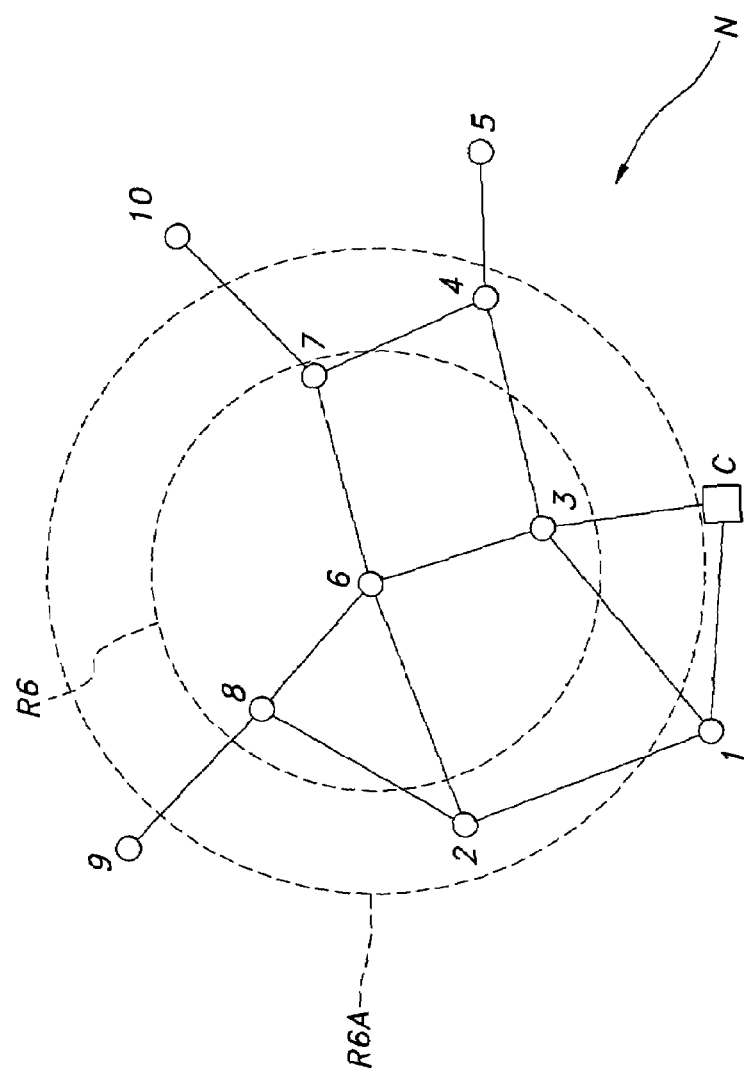
FIG. 3 is a diagram of the wireless network of FIG. 1 according to another embodiment of the invention.

It is possible that nodes in the network have differing types of non-communications capabilities. In a military communications network the military resources have different mobility and armament characteristics and capabilities. A fixed-wing aircraft travels much faster than an infantry unit and may therefore render assistance in less time than a proximal infantry unit. One embodiment of the invention allows for non-communications differences between various types of nodes and assigns predetermined forwarding ranges based upon the type of node. For instance, node 6 in FIG. 3 uses a first predetermined forwarding range R6 to determine whether to forward a first type of node and uses a second predetermined forwarding range R6A to determine whether to forward a second type of node. The first type of node may be an infantry unit having a limited amount of mobility. The second type of node may be a fixed-wing aircraft having a much higher degree of mobility and effective assistance range than the infantry unit. The nodes in the network would therefore benefit from knowing the position of fixed-wing aircraft that are further away than nearby infantry units but still within an effective assistance range. According to the depicted embodiment, upon receiving an SA message from adjacent node, node 6 determines which type of node is the originator of the SA message. If the originating node is a first type of node, node 6 forwards the SA message when the location of the originating node is within the first predetermined forwarding range R6 (such as nodes 3, 7 or 8). If the originating node is a second type of node, node 6 forwards the SA message when the location of the originating node is within the second predetermined forwarding range (such as nodes 2, 3, 4, 7 or 8). If there are three or more types of nodes in the network, a corresponding number of predetermined forwarding ranges may be used to differentiate between the various capabilities of the different types of nodes.

The invention as described thus far has disclosed a method of determining and broadcasting situational awareness messages in a wireless network, where the situational awareness information is forwarded in a limited fashion to conserve communications resources. There may be instances, however, where a node in the network desires or has a legitimate need to determine the location of each node in the network regardless of distance. A node having responsibility for part or all of the nodes in the network, such as a command center in a civil defense or military communications network, needs to know the location of those nodes for which it is responsible. According to the invention, a node such as command node C in FIG. 1 broadcasts a situational awareness (SA) request throughout the entire network. The SA request from command node C instructs each node to ignore or override the predetermined forwarding ranges when forwarding responses to the SA request. The SA request is sent to each node in the network along a path as established by known path determination algorithms. Each node, upon receiving a SA request from command node C, transmits an SA response that may include position, current speed, bearing, armament condition, or other types of information useful to command node C. The SA response is returned to command node C via a path as established by known path determination algorithms, which in most cases would be the path along which the SA request was received. In contrast to an SA message, nodes in the path of the SA response do not determine whether the node responding to the SA response is within a predetermined forwarding range. In this manner, SA responses from all nodes in the network are forwarded or re-transmitted back to command node C regardless of any node's distance from the command node.

Figure 4:
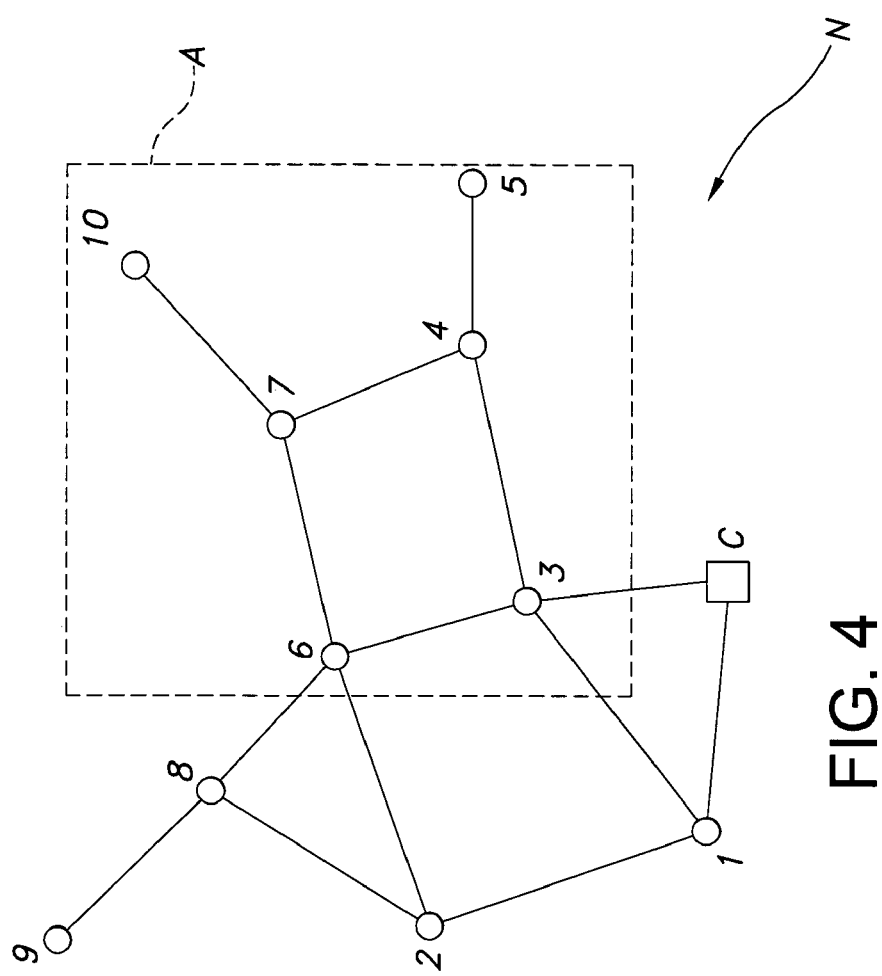
FIG. 4 is a diagram of the wireless network of FIG. 1 according to still another embodiment of the invention.

FIG. 4 shows another embodiment of the invention in which command node C has responsibility for only a portion A of the network N. In such a case the SA request may include a geographic limiter command that instructs nodes in the network to respond to the SA request only if the nodes are within the portion A over which command node has responsibility. Command node C may be located within portion A, or as shown in FIG. 4 command node C may be located outside portion A.

The invention may be varied in many ways. For example, it may be possible for any node in a network to send an SA request to all nodes in the network, but for network security it may be advisable to limit the number or type of nodes that are permitted to transmit SA requests. Another variation is that command node C may only have responsibility for a portion of the network.

The invention as described provides an efficient method of providing situational awareness of all nodes in a region, including to a command node. An advantage of the invention is that because only nodes within the specified geographic region respond to such a message, communications resources such as broadcast bandwidth are conserved.

Another advantage is that each node within the region responds to the inquiry using the same transmission path traversed by the inquiry. This further conserves communications resources.

Still another advantage of the invention is that a requesting node is not required to be within the same geographic region of the nodes from which situational awareness information is being requested. This makes it possible for a command node in a military or emergency situation to quickly inventory resources within an assigned area.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of sharing situational awareness information between nodes in a wireless communications network, each node being one of a plurality of node types, each node type being differentiated from other node types by non-communications characteristics of an entity associated with said each node, the network including a requesting node, the method comprising:

a first node periodically transmitting a situational awareness message;

a second node receiving the situational awareness message;

the second node determining a distance from the first node to the second node;

the second node re-transmitting the received situational awareness message when the first node is within a predetermined distance of the second node, the predetermined distance being dependent on the node type of the first node;

the requesting node transmitting a situational awareness request to a set of nodes in the network;

the nodes in the set of nodes transmitting a situational awareness response in response to the situational awareness request; and each node in the network upon receiving any situational awareness response, re-transmitting the response toward the requesting node.

2. The method of claim 1, wherein each node receiving a situational awareness response re-transmits the situational awareness response regardless of a distance between the re-transmitting node and the node transmitting the situational awareness response.

3. The method of claim 1, wherein the situational awareness request to each node is transmitted along a transmission path, and wherein the situational awareness response is transmitted along the transmission path.

4. The method of claim 1, wherein the non-communications characteristics include at least one of speed, bearing, and operating condition.

5. The method of claim 1, wherein the set of nodes comprises all nodes in the network.

6. The method of claim 1, wherein the set of nodes comprises all nodes with a geographic region.

7. The method of claim 1, wherein the requesting node is outside a geographic region that defines the set of nodes.

8. The method of claim 1, wherein the requesting node is within a geographic region that defines the set of nodes.

\* \* \* \* \*